No. 790,409.                                              Patented May 23, 1905.

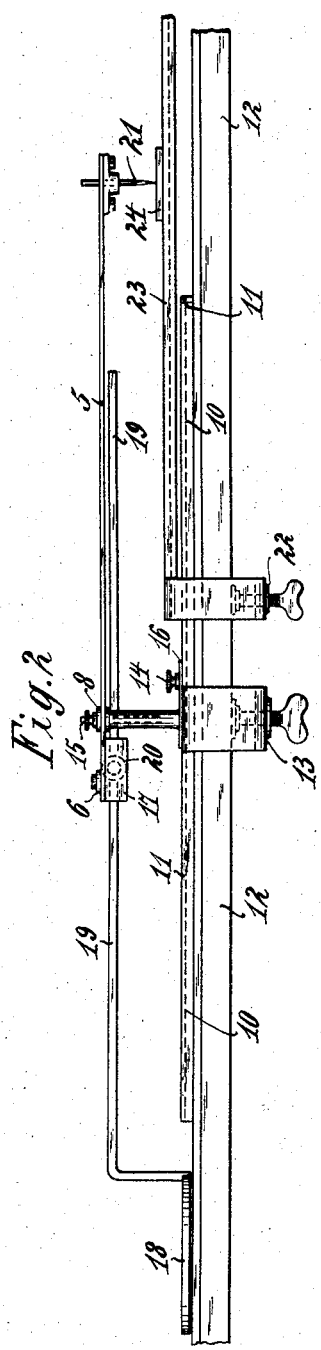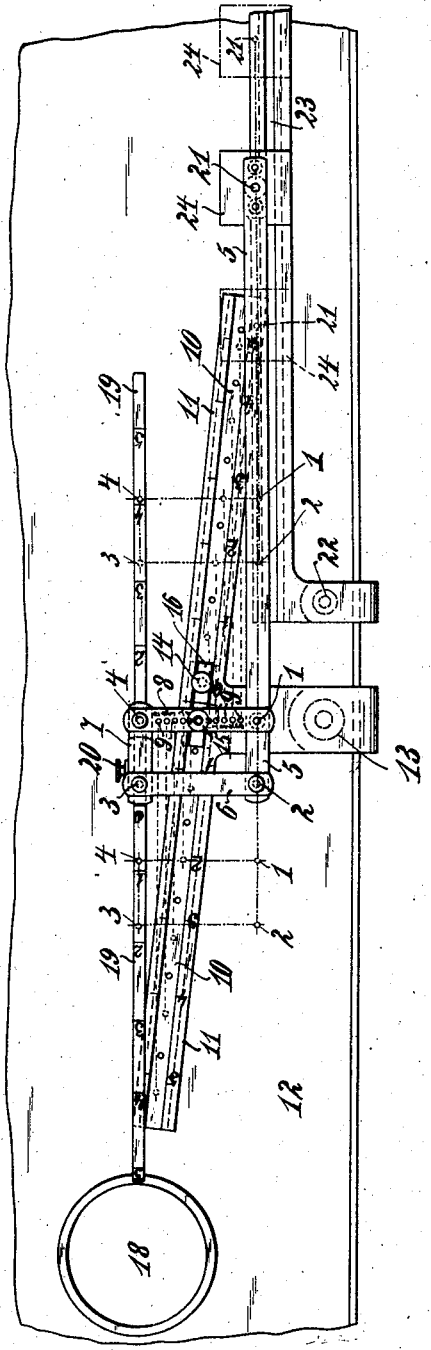

UNITED STATES PATENT OFFICE.

MAX TRAUTMANN, OF LEIPSIC-NEUSTADT, GERMANY.

PANTOGRAPH FOR EMBROIDERING.

SPECIFICATION forming part of Letters Patent No. 790,409, dated May 23, 1905.

Application filed November 23, 1903. Serial No. 182,361.

*To all whom it may concern:*

Be it known that I, MAX TRAUTMANN, a subject of the Emperor of Germany, residing at Leipsic-Neustadt, Saxony, Germany, have invented certain new and useful Improvements in Pantographs, of which the following is a description.

The present invention relates to improvements in pantographs for embroidering-machines; and it consists of the details of construction hereinafter set forth.

In order to render the present invention easily intelligible, reference is had to the accompanying drawings, in which similar numerals of reference denote similar parts throughout both the views.

Figure 1 is a plan, and Fig. 2 a side elevation, of the improved pantograph.

The pantograph consists of four bars 5, 6, 7, and 8, pivotally connected with each other by means of bolts 1, 2, 3, and 4, the bar 8 having a series of orifices 9, in which a pin 15 may be adjusted. Beneath the pantograph and arranged diagonally to the same a bar 11 is provided, having a slot 10, the said bar 11 being clamped to the table 12 by means of a screw-clamp 13, which is screwed onto the table 12 of the machine. A movable slide 16, adjustable by means of a set-screw 14 and having a pin 15, is arranged to slide in the slot 10 of the guide-bar 11, which supports the pantograph. The pin 15 is adjusted in one of the orifices of the bar 8. The four corners 1 2 3 4 of the pantograph when the latter is free to move about the pin 15 may be adjusted in relation to the said pin. Underneath the front end of the bar 7 a sleeve 17 is provided, in which a rod 19, carrying the embroidering-frame, is free to slide. The rod 19 may be clamped in the desired position by the screw 20. At the rear end of the opposite bar 5 of the parallelogram 5 6 7 8 the stylus 21 is mounted, which is adjustable vertically to a small extent in its bearing, so that it may be guided closely on the original drawing and, if necessary, raised off the same. At the front right side of the table 12 a guide 23 is clamped to the table by means of a screw-clamp 22, and in this guide 23 the original pattern-plate 24 may be adjusted.

The mode of operation is as follows: In the accompanying drawings the pantograph is shown in its central position, in which the embroidery-pattern to be traced from the original pattern is reproduced on the same scale as the original. If, for instance, the embroidery-pattern is to be reduced to a size less than the original, the pin 15 should be placed in a hole of the bar 8 above that in which it is shown. The pin 15 and the slide 16 are then moved upward in the slot 10 of the rod 11 until the slide is in alinement with the number of the scale on the bar 11 corresponding to the selected number on the bar 8. After the rod 19, carrying the embroidering-frame, and the pattern 24 have been adjusted backward in their respective sleeves 17 and 23 far enough to bring the center point of the frame beneath the needle-point and the stylus 21 in the center of the pattern 24 the apparatus will be properly adjusted, and the work may begin. This adjustment is shown by lines traced with one dot and a dash. If the embroidery-pattern is to be enlarged, pin 15 is adjusted in one of the orifices of the rod 8 below the zero-point, and the slide 16, with the pin 15, is moved downward in the slot of the bar 11, while the pattern 24 is moved to the right in the guide 23. This adjustment is shown by lines traced with two dots and a dash.

I do not confine myself to the details of construction hereinbefore described, as it is evident that I may alter the constructional arrangement without departing from the broad lines of my invention.

I claim as my invention—

A pantograph for embroidering-machines consisting of four bars 5, 6, 7 and 8, the latter of which is provided with a series of adjusting-orifices 9, said bars being pivoted together at 1, 2, 3 and 4 of a stylus 21 mounted at one end of the bar 5 and capable of a slight up-and-down movement, of a bar 11 having slot 10, the said bar 11 being clamped to the table 12 of the machine of a slide 16 guided in the slot of the bar 11 and adapted to be clamped in the desired position, of a pin 15 mounted on said slide capable of adjustment in one of the orifices of the bar 8, of a sleeve 17 on the bar 7 in which the rod 19 carrying the embroidering-frame 18 is guided, of means for clamping said rod in position and of a guide 23 to receive the original pattern 24 and means for clamping the said guide to the table substantially as described.

In witness whereof I have hereunto set my hand in presence of two witnesses.

MAX TRAUTMANN.

Witnesses:
MORITZ SPREER,
RUDOLPH FRICKE.